C. A. PALMGREN.
DRILL AND CHUCK.
APPLICATION FILED MAY 23, 1912.
1,041,338.
Patented Oct. 15, 1912.
2 SHEETS—SHEET 1.
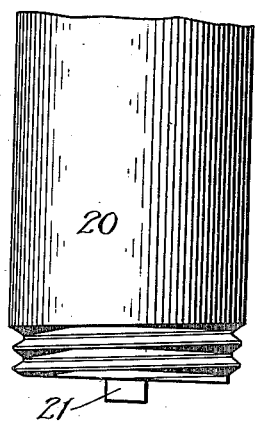
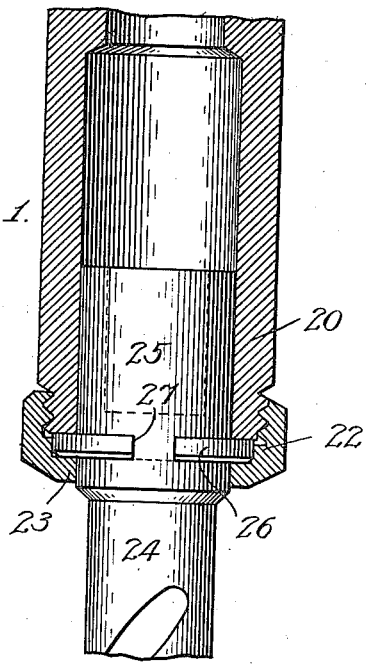
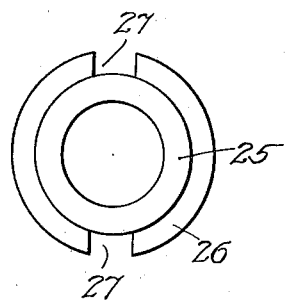
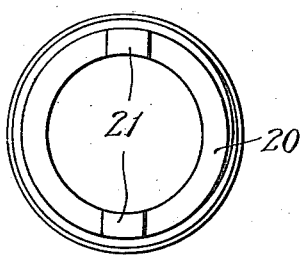
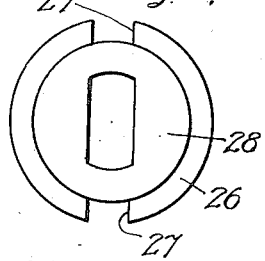
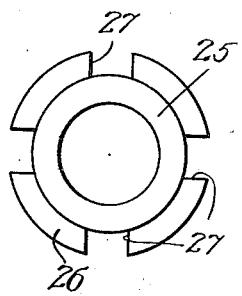
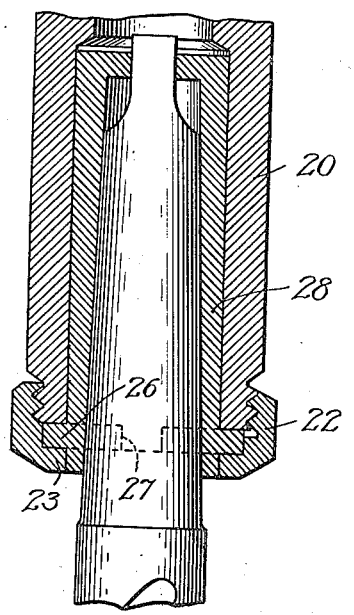
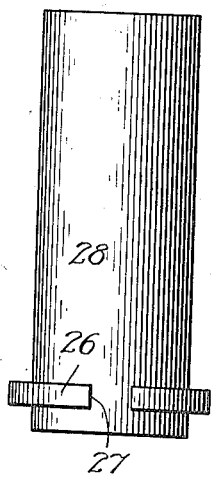
Inventor:
Carl A. Palmgren,
By Dyrenforth, Lee, Chritton and Wiles,
Attys.

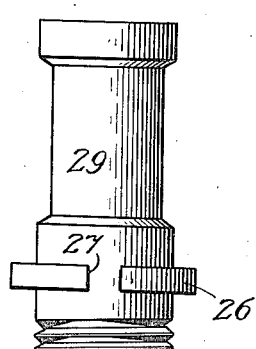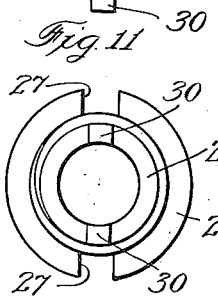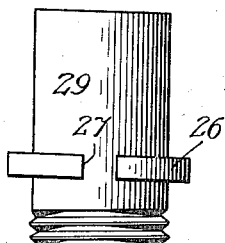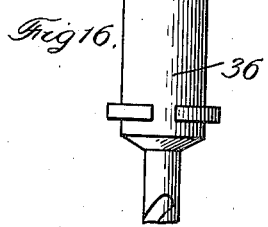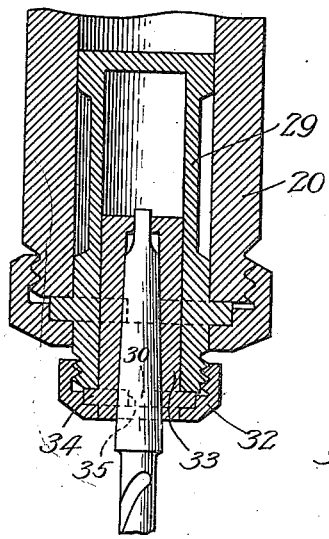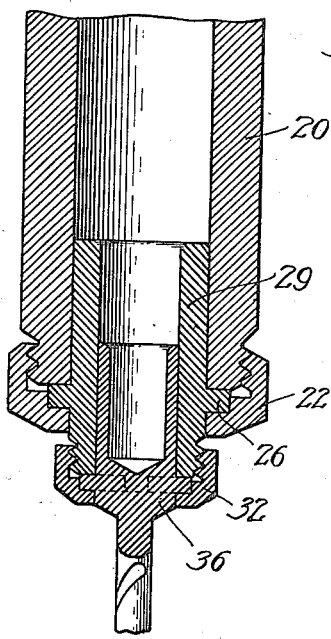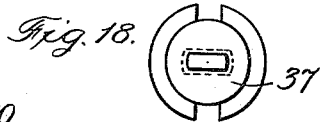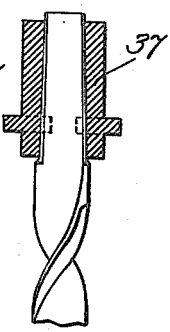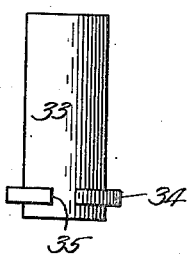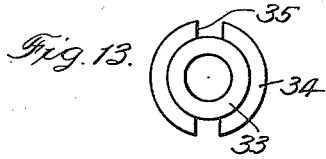

UNITED STATES PATENT OFFICE.

CARL A. PALMGREN, OF CHICAGO, ILLINOIS.

DRILL AND CHUCK.

1,041,338.

Specification of Letters Patent. Patented Oct. 15, 1912.

Application filed May 23, 1912. Serial No. 699,171.

*To all whom it may concern:*

Be it known that I, CARL A. PALMGREN, a citizen of the United States, residing at Chicago, in the county of Cook and State of Illinois, have invented a new and useful Improvement in Drills and Chucks, of which the following is a specification.

My invention relates to certain new and useful improvements in drill and chuck, and is fully described and explained in the specification and shown in the accompanying drawings, in which:—

Figure 1 is a longitudinal section through my improved chuck showing the drill in elevation; Fig. 2 is an elevation of the lower part of the chuck; Fig. 3 is an end view of the part shown in Fig. 2; Fig. 4 is a top plan of the drill; Fig. 5 is a longitudinal section through the chuck and a sleeve inserted therein to adapt the structure to receive a taper-shank drill, the drill being shown in elevation; Fig. 6 is a top plan of the sleeve of Fig. 5; Fig. 7 is an elevation of the sleeve; Fig. 8 is a view similar to Fig. 4 of a modified form of drill; Fig. 9 is a longitudinal section showing the chucks with two separate sleeves, one inside the other, the smaller sleeve being adapted to take a taper-shank drill of small size which is shown in elevation; Fig. 10 is an elevation of the larger of the two sleeves of Fig. 9; Fig. 11 is a bottom plan of the sleeve of Fig. 10; Fig. 12 is an elevation of the inner or smaller sleeve of Fig. 9; Fig. 13 is a bottom plan thereof; Fig. 14 is a longitudinal section through the chuck, a sleeve and a small-sized drill of my improved type; Fig. 15 is an elevation of the sleeve of Fig. 14; Fig. 16 is an elevation of the drill of Fig. 14; Fig. 17 is a section through a sleeve adapted to receive a flat drill, and Fig. 18 is a top plan of the sleeve of Fig. 17 showing the drill in position.

Referring to the drawings, 20 is the chuck proper, the same being in the form of a hollow cylinder, externally threaded at its lower end and provided with one or more teeth 21 extending downwardly from its lower margin. These teeth may be in any number desired, the chuck in all the illustrations thereof being provided with two teeth, and the other parts of the construction being correspondingly shaped. In one figure, Fig. 8, I have shown a coöperating part adapted to enter a chuck having four teeth and, of course, it will be understood that the chuck and its coöperating parts may have the number and position of these teeth vary at will.

22 is a ring internally threaded and adapted to be screwed up on the lower end of the chuck proper, the lower end of this ring having an inturned lip 23.

24 is my improved drill, the same having a cylindrical shank 25 adapted to fit within the chuck proper 20, and having a projecting flange 26 having notches 27 to be engaged by the tooth, or teeth 21, of the chuck proper. In the construction shown in Fig. 4, there are two such notches while in that shown in Fig. 8 there are four such notches, it being understood that in any event the teeth on the chuck and drill flange are adapted to register.

In using my improved drill and chuck the ring is screwed off the chuck, the drill being placed in position with the teeth on the chuck registering with the notches in the flange of the drill and the ring is then screwed up. In this way a perfectly firm support for the drill in the chuck is secured. It is impossible for the drill to drop out or to rotate and yet by a very simple manipulation the drill can be removed from position. Furthermore, all the parts are of the simplest and cheapest character, the construction being even cheaper than that of the common taper-shank drill and its chuck now used. The device is peculiarly advantageous because no shock or blow is required to set the drill in position, because the drill can be removed from the chuck with certainty and ease, when desired, and because there is no danger of the drill dropping out of the chuck accidentally while in use, these three points being evident and great improvements over the taper-shank drill which is the standard and by far the most common drill in use.

While the ultimate object of my invention is to supply my improved chuck and drills therefor, as shown in Fig. 1, the drills being supplied in sufficient quantity to be the sole type used with the chuck, I am aware that when the first installation of chucks of this character are made in any plant, there will be on hand necessarily a large number of drills of other sorts, more especially the standard taper-shank drills, and in order to make the chuck practical from the beginning, means must be provided for using up these drills. Therefore, I provide a sleeve 28 the outer configuration of which is exactly the same as that of the upper of the drill 24, except that it is made longer, but it is provided with the same notched flange 26 as the upper part of the drill. The sleeve 28 however has a tapered socket to receive a taper-shank drill and the upper end of this sleeve is slotted for the passage therethrough of the flat end of the taper-shank drill. This construction not only enables my improved chuck to be used with the taper-shank drills already on hand, but it makes a combination when used with that drill which is more advantageous than said drill is when used in the chuck especially made for it. This is because the standard taper-shank drill has to be driven out of its socket by driving a wedge laterally into the chuck so as to engage with its upper end, and the use of this lateral driving pressure is likely to bend or distort the chuck, or even damage the tool by which this chuck is supported, or of which it forms a part. With my construction when used with a taper-shank drill, the sleeve 28 is removed from place with the drill in it and a tap of the hammer directly on the top of the taper-shank drill will drive it out without any difficulty.

When it is desired to use my chuck with drills of a smaller size than that which it is designed to receive directly, a sleeve 29 is inserted. Two forms of this sleeve are shown in Figs. 9 and 14, but there is no substantial difference between their construction except in the matter of shape. Each of these sleeves has its upper part shaped exactly like the upper part of my improved drill or the sleeve 28 on the outside, and it has the notched flange 26 common to the various members so far described which fit directly in the chuck 20. The sleeve 29, however, differs from the sleeve 28 in that it is made cylindrical on its inside and terminates at its lower end exactly as does the chuck, but on a smaller scale. That is, the sleeve 29 is screw-threaded at its bottom and has a tooth 30 like that on the chuck. A ring 32 is adapted to screw up on the lower end of the sleeve 29 to hold therein another part.

In Fig. 9, I have shown inside the sleeve 29 a sleeve 33 having a flange 34 notched at 35, the outside of this sleeve being therefore similar to the outside of the sleeve 28 but on a smaller scale. The sleeve 33 has a tapered socket, like that of the sleeve 28, adapted to receive a taper-shank drill of small diameter.

In the form shown in Fig. 14, the sleeve 29 receives a drill 36 exactly similar to the drill 24, but on a smaller scale. In Fig. 17 is shown a slotted member 37 similar to the upper end of the drill 36 and adapted to fit in the sleeve 29, said slotted member 37 being adapted to receive a drill of flat cross-section in an obvious way and for an obvious purpose.

In the foregoing constructions, that is, of Figs. 9 to 17, inclusive, being those wherein means are provided for adapting a chuck to the use of relatively small drills, another most important advantage of my construction appears. In the use of ordinary taper-shank drills, which are the standard and most common type in use, sleeves are provided whereby a drill smaller than the chuck may be used, but owing to the tapered arrangement of one or more of these sleeves necessitates a considerable lowering of the drill below the point which the drill of proper size for the chuck would have to occupy. With my construction on the contrary, one sleeve may be placed inside another to reduce the size of the chuck to any desired extent and each sleeve added will lower the end of the combined or built-up structure only the thickness of an additional ring, or slightly more. This, of course, results in a much firmer construction than was heretofore obtainable and one much more compact.

It will, of course, be understood that the present device can be used in many positions, either in drill-presses, ratchets, or various sorts of hand or machine-operated tools. It will also be evident that while the improvement is in a rather well-developed art it is capable of some variation without departing from the spirit of the invention disclosed; and therefore while the preferred forms have been set forth in detail, it is not intended to be limited thereto, except as pointed out in the claims in which the intention is to claim all the novelty inherent in the construction as broadly as is permitted by the art.

I claim as new and desire to secure by Letters Patent:

1. In combination, a chuck of cylindrical form exteriorly-threaded at its end and provided with a tooth, a ring to screw up on said chuck and having an inturned lip, and a male part to enter the chuck and provided with a flange to lie between the end thereof and the lip of said ring, said flange being notched to be engaged by said tooth, for the purpose set forth.

2. In combination, a chuck of cylindrical form exteriorly threaded at its end and provided with a tooth, a ring to screw up on said chuck and having an inturned lip, and a drill-head to enter said chuck provided with a flange to lie between the end thereof and the lip of said ring, said flange being notched to be engaged by said tooth, for the purpose set forth.

3. In combination, a chuck of cylindrical form exteriorly threaded at its end and provided with a tooth, a ring to screw up on said chuck and having an inturned lip and a sleeve to enter said chuck, said sleeve being exteriorly threaded at its end and being provided with a tooth, being also provided with a flange to lie between the end of said chuck and the lip of said ring, said flange being notched to receive said tooth, a second ring having an inturned lip to screw up on the end of said sleeve and a drill fitting the sleeve and having a flange to lie between the sleeve and said second ring, and a notch to be engaged by the tooth of said sleeve.

4. In combination, a female part of cylindrical form exteriorly threaded at its end and provided with a tooth, a ring to screw up thereon having an inturned lip and a drill to enter said female part having a flange to lie between the end thereof and the lip of said ring, said flange being notched to be engaged by the tooth of said female part for the purpose set forth.

5. As an article of manufacture, a drill to coöperate with a chuck of the character described and having a cylindrical shank and a projecting notched flange, for the purpose set forth.

In testimony whereof I have hereunto set my hand.

CARL A. PALMGREN.

In presence of two subscribing witnesses:
J. G. ANDERSON,
R. A. SCHAEFER.